(12) United States Patent
Heo et al.

(10) Patent No.: US 10,678,859 B2
(45) Date of Patent: Jun. 9, 2020

(54) PLANT MATERIAL RECOMMENDATION APPARATUS IN USE ENVIRONMENT

(71) Applicant: Korea Testing Certification (KTC), Seoul (KR)

(72) Inventors: Joong Sik Heo, Seongnam-si (KR); Dea Kyung Kang, Hwaseong-si (KR); Sung Jae Won, Suwon-si (KR); Seung Hyun Cho, Gwacheon-si (KR)

(73) Assignee: Korea Testing Certification (KTC), Seoul (KR)

( * ) Notice: Subject to any disclaimer, the term of this patent is extended or adjusted under 35 U.S.C. 154(b) by 169 days.

(21) Appl. No.: 15/939,142

(22) Filed: Mar. 28, 2018

(65) Prior Publication Data

US 2019/0102479 A1    Apr. 4, 2019

(30) Foreign Application Priority Data

Sep. 29, 2017 (KR) .................. 10-2017-0126820

(51) Int. Cl.
| | | |
|---|---|---|
| *G06F 16/00* | (2019.01) | |
| *G06F 16/9032* | (2019.01) | |
| *G05B 19/408* | (2006.01) | |
| *G05B 19/418* | (2006.01) | |
| *G06F 17/11* | (2006.01) | |
| *G06Q 50/08* | (2012.01) | |

(52) U.S. Cl.
CPC ..... *G06F 16/90328* (2019.01); *G05B 19/408* (2013.01); *G05B 19/418* (2013.01); *G06F 17/11* (2013.01); *G06Q 50/08* (2013.01); *G05B 2219/36284* (2013.01); *G05B 2219/49301* (2013.01)

(58) Field of Classification Search
None
See application file for complete search history.

(56) References Cited

U.S. PATENT DOCUMENTS

| | | | |
|---|---|---|---|
| 2012/0047025 A1* | 2/2012 | Strohman | G06Q 30/0275 705/14.71 |
| 2013/0174040 A1* | 7/2013 | Johnson | G06Q 10/06 715/733 |
| 2018/0132423 A1* | 5/2018 | Rowan | A01G 22/00 |

FOREIGN PATENT DOCUMENTS

| | | |
|---|---|---|
| KR | 10-2000-0030809 A | 6/2000 |
| KR | 10-0683580 B1 | 2/2007 |

* cited by examiner

*Primary Examiner* — Son T Hoang
(74) *Attorney, Agent, or Firm* — Studebaker & Brackett PC (57) ABSTRACT

The present disclosure relates to a plant material recommendation apparatus including a processor and a non-transitory computer-readable recording medium communicatively coupled to the processor. The processor stores a plant material environment and a plant material pre-constructed in a currently installed plant facility, receives a coarse intended plant material environment, creates a standard plant material environment, converts the standard plant material environment into an actual plant material environment, provides at least one recommended plant material configured to be used in the actual plant material environment to a user terminal, receives a candidate material selection reason for each of at least one candidate plant material, and analyzes candidate material selection reasons for at least one candidate plant material to a final plant material.

5 Claims, 5 Drawing Sheets

HOW TO SELECT MATERIAL

| SELECT MATERIAL ENVIRONMENT | ENTER DESIRED MATERIAL NAME |
|---|---|
| --Environment-- ⌄ 🔍 | ex) carbon steel 🔍 |

◎ SEARCH RESULT OF MATERIAL ENVIRONMENT

| Environment | Conc.% | Temp. (℃) | Air Present | Velocity (m/s) # | Basic Material | Remarks |
|---|---|---|---|---|---|---|
| Acid, hydrochloric | 1 - 37 | 0 - 55 | N/A | 0 - 2.4 | PVC | |
| | 1 - 37 | ambient | N/A | 0 - 2.4 | HDPE | |
| | 1 - 37 | ambient | N/A | 0 - 2.4 | PP | |
| | 1 - 37 | ambient | N/A | 0 - 2.4 | RTR (vinyl ester) | |
| | 1 - 37 | 0 - 82 | No | 0 - 1.5 | Alloy B2 | |
| | 1 - 37 | ambient | N/A | 0 - 2.4 | Carbon steel | |
| Acid, hydrofluoric | 71 - 100 | 0 - 40 | No | 0 - 1 | Carbon steel | Post-weld heat treatment may be required |
| | 1 - 75 | ambient | No | 0 - 2.4 | HDPE | |
| | 1 - 70 | 0 - 50 | No | 0 - 2 | Monel 400 | |
| Acid, nitric | 1 - 30 | ambient | No | 0 - 2.4 | HDPE | |
| | 1 - 30 | ambient | N/A | 0 - 2.4 | Carbon steel | |
| | 1 - 70 | 0 - 80 | N/A | 0 - 4 | Type 316L S/S | |
| | 71 - 95 | 0 - 50 | N/A | 0 - 4 | Type 316L S/S | |

FIG. 4A

| SELECT MATERIAL ENVIRONMENT | ENTER DESIRED MATERIAL NAME |
|---|---|
| Hydrogen sulfide.Dry | carbon steel |

◎ SEARCH RESULT OF MATERIAL 'CARBON STEEL'

| NO. | STANDARD NO. | STANDARD NAME |
|---|---|---|
| 13 | ASME SA-106 | Seamless carbon steel pipe for High-temperature service |
| 12 | ASME SA-727 | Specification for carbon steel Forgings for Piping Components with Inherent Notch Toughness |
| 11 | ASME SA-587 | Specification for Electric-Resistance-Welded Low-carbon steel Pipe for the Chemical Industry |
| 10 | ASME SA-660 | Specification for Centrifugally Cast carbon steel Pipe for High-Temperature Service |
| 9 | ASME SA-283/SA-283M | Specification for Low and Intermediate Tensile Strength carbon steel Plates |
| 8 | ASME SA-515/SA-515M | Specification for Pressure Vessel Plates, carbon steel, for Intermediate... |
| 7 | ASME SA-516/SA-516M | Specification for Pressure Vessel Plates, carbon steel, for Moderate- and Lower Temperature... |
| 6 | ASME SA-612/SA-612M | Specification for Pressure Vessel Plates, carbon steel, High Strength, for Moderate and Lower... |
| 5 | ASME SA-455/SA-455M | Specification for Pressure Vessel Plates, carbon steel, High Strength Manganese |
| 4 | ASME SA-285/SA-285M | Specification for Pressure Vessel Plates, carbon steel, Low and Intermediate-Tensile Strength |
| 3 | ASME SA-299/SA-299M | Specification for Pressure Vessel Plates, carbon steel, Manganese-Silicon |
| 2 | ASME SA-562/SA-562M | Specification for Pressure Vessel Plates, carbon steel, Manganese-Titanium for Glass or Diffused... |
| 1 | ASME SA-524 | Specification for Seamless carbon steel pipe for Atmospheric and Lower Temperatures |

FIG. 4B

PLANT MATERIAL RECOMMENDATION APPARATUS IN USE ENVIRONMENT

BACKGROUND OF THE INVENTION

Field of the Invention

The present invention relates to a plant material recommendation technology, and more particularly, to a plant material recommendation apparatus capable of recommending a plant material suitable for a use environment.

Related Art

Oil Sand is a natural mixture of bitumen, sand, water, clay. A lot of oil sand is buried in Alberta in Canada and a basin of the Orinoco River in Venezuela. Since the oil sand is exposed to the surface of the ground in a solid or semi-solid state, the sand is collected and refined through heat treatment to extract They are exposed to the surface in solid or semi-solid state and can be extracted by heat treatment to extract intermediate. However, there is a disadvantage that it takes a lot of money to construct an oil sand production plant.

Korean Patent Unexamined Publication No. 10-2000-0030809 (Jun. 5, 2000) relates to a network based plant engineering special information providing system provides apparatus and material information, technical data, and business information required for plant engineering for each field of at least seven specialized fields (machinery, piping, electricity, measurement control, civil engineering, architecture, and chemical fields) constituting plant engineering in real time in an online state to allow engineers of each plant engineering company and each plant construction company to obviously search for the technical data, apparatus and material information, and business information required for design, apparatus and materials, purchasing, and construction work and an apparatus and material maker or provider to utilize the technical data, the apparatus and material information, and business information as introduction of the apparatus and material and a showroom of promotion through disclosure of an apparatus and material specification of its own company.

Korean Patent Registration No. 10-0683580 (Feb. 9, 2007) has a technical features in that an intelligent plant information system includes a plant information collecting unit for collecting, storing, and managing base data related to dispersed plant facility information in a data server; a plant information managing unit that performs processing, analysis, display, search, transmission, and output functions for facility state management, maintenance history management, facility information management, facility location search, and facility risk management services based on data collected through the plant information collecting unit; an ERP linkage unit linked with an ERP system of an organization that manages and operates a plant, and an EAI linkage unit which operates in link with an application system and an application program used by the organization that manages and operates the plant facility.

SUMMARY OF THE INVENTION

The present invention provides a plant material recommendation apparatus that can recommend a plant material suitable for a use environment.

The present invention also provides a plant material recommendation apparatus that can provide a material of a plant facility suitable for an environment desired by a user based on information on an installed plant facility material and an environment.

The present invention also provides a plant material recommendation apparatus that can provide specific information regarding each material according to an environment of the plant facility material desired by the user and the plant material.

Among embodiments, in an aspect, provided is a plant material recommendation apparatus in a use environment, which includes: a plant material database unit storing a plant material environment and a plant material pre-constructed in a currently installed plant facility; a coarse intended plant material environment receiving unit receiving a coarse intended plant material environment in which an intended plant facility is to be installed; a standard plant material environment creating unit creating a standard plant material environment including a related material concentration (Conc.), a related material temperature (Temp.), and a related material velocity (Velocity) regarding the coarse intended plant material environment through the plant material database unit; an actual plant material environment creating unit converting the standard plant material environment into an actual plant material environment by estimating a material environment error range for the intended plant facility, which may occur in the coarse intended plant material environment; a candidate plant material determining unit providing at least one recommended plant material which may be used in the actual plant material environment to a user terminal and receiving a candidate material selection reason including at least one of market price, hardness, tensile strength, elongation, heat distortion temperature, thermal conductivity, expansion coefficient, dielectric breakdown strength, strong acidity resistance, and strong alkaline resistance for each of at least one candidate plant material selected among at least one recommended plant material; and a final plant material determining unit comprehensively analyzing all candidate material selection reasons for at least one candidate plant material to a final plant material.

The coarse intended plant material environment receiving unit may receive a moisture range, an acidity range, a temperature range, a base range, and a wind range as the coarse intended plant material environment.

The actual plant material environment creating unit may determine the material environmental error range by analyzing a mutual influence between the moisture range, the acidity range, the temperature range, the base range, and the wind range in the coarse intended plant material environment.

The actual plant material environment creating unit may analyze the mutual influence between the moisture range, the acidity range, the temperature range, the base range, and the wind range according to an equation below.

$$\Delta H = H + \ln(P^*C+S) + \mathrm{Sin}\, 2\pi W + \mathrm{Cos}\, 2\pi T$$

$$\Delta C = C + \ln(P^*H+S) + \mathrm{Sin}\, 2\pi W + \mathrm{Cos}\, 2\pi T$$

$$\Delta T = T + \ln(P^*H+W) + \mathrm{Sin}\, 2\pi S + \mathrm{Cos}\, 2\pi C$$

$$\Delta S = S + \ln(P^*C+H) + \mathrm{Sin}\, 2\pi W + \mathrm{Cos}\, 2\pi T$$

$$\Delta W = W + \ln(P^*C+S) + \mathrm{Sin}\, 2\pi H + \mathrm{Cos}\, 2\pi T \qquad \text{[Equation 1]}$$

$\Delta H$ represents the moisture range, $\Delta C$ represents the acidity range, $\Delta T$ represents the temperature ranges, $\Delta S$ represents the base range, and $\Delta W$ represents the wind range and H, C, T, S, and W correspond to H, C, T, S, and W in a standard state, respectively and P corresponds to standard atmospheric pressure.

The candidate plant material determining unit may determine reliability between a material property and the material selection reason of each of at least one recommended plant material and make the corresponding recommended plant material be included as at least one candidate plant material when the reliability is equal to or greater than a specific reference value.

The final plant material determining unit may determine N (N is a natural number) selection reasons which are most frequently selected based on all candidate material selection reasons.

The final plant material determining unit may determine the recommended plant material showing a highest matching degree with N selection reasons among at least one recommended plant material as the final plant material.

The final plant material determining unit may determine the matching degree through an equation below.

$$Y=(\alpha*N1, \beta*N2, \gamma*N3, \ldots, \omega*Nn) \quad \text{[Equation 2]}$$

Y represents the matching degree, $\alpha$, $\beta$, $\gamma$, . . . , $\omega$ as weighting coefficients are sequentially calculated by $C*1/X$ (C is a positive constant and X is a positive number), and N1, N2, N3, . . . , Nn correspond to the number of materials including elements arranged in a descending order in N selection reasons.

DESCRIPTION OF EXEMPLARY EMBODIMENTS

A description of the present invention is merely an embodiment for a structural or functional description and the scope of the present invention should not be construed as being limited by an embodiments described in a text. That is, since the embodiment can be variously changed and have various forms, the scope of the present invention should be understood to include equivalents capable of realizing the technical spirit. Further, it should be understood that since a specific embodiment should include all objects or effects or include only the effect, the scope of the present invention is limited by the object or effect.

Meanwhile, meanings of terms described in the present application should be understood as follows.

The terms "first," "second,", and the like are used to differentiate a certain component from other components, but the scope of should not be construed to be limited by the terms. For example, a first component may be referred to as a second component, and similarly, the second component may be referred to as the first component.

It should be understood that, when it is described that a component is "connected to" another component, the component may be directly connected to another component or a third component may be present therebetween. In contrast, it should be understood that, when it is described that an element is "directly connected to" another element, it is understood that no element is present between the element and another element. Meanwhile, other expressions describing the relationship of the components, that is, expressions such as "between" and "directly between" or "adjacent to" and "directly adjacent to" should be similarly interpreted.

It is to be understood that the singular expression encompass a plurality of expressions unless the context clearly dictates otherwise and it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

The present invention can be implemented as a computer-readable code on a computer-readable recording medium and the computer-readable recording medium includes all types of recording devices for storing data that can be read by a computer system. Examples of the computer readable recording medium may include a ROM, a RAM, a CD-ROM, a magnetic tape, a floppy disk, an optical data storage device, and the like. Further, the computer readable recording media may be stored and executed as codes which may be distributed in the computer system connected through a network and read by a computer in a distribution method.

If it is not contrarily defined, all terms used herein have the same meanings as those generally understood by those skilled in the art. Terms which are defined in a generally used dictionary should be interpreted to have the same meaning as the meaning in the context of the related art, and are not interpreted as an ideal meaning or excessively formal meanings unless clearly defined in the present application.

Figure 1:
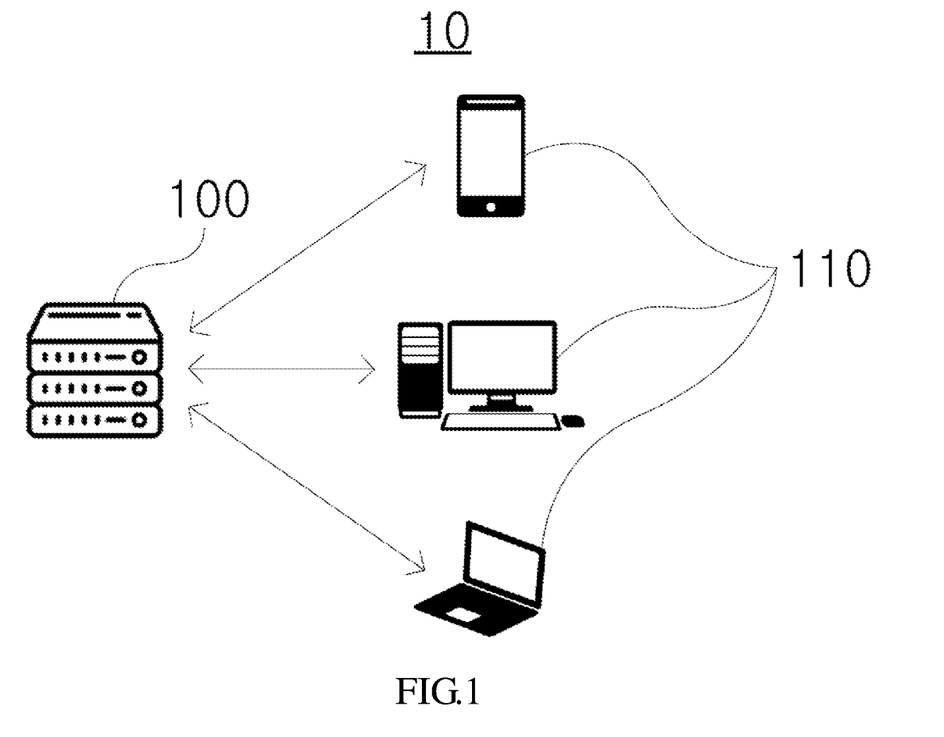
FIG. 1 is a diagram for describing a plant material recommendation system according to an embodiment of the present invention.

FIG. 1 is a diagram for describing a plant material recommendation system according to an embodiment of the present invention.

Referring to FIG. 1, a plant material recommendation system 10 in a use environment includes a plant material recommendation apparatus 100 (hereinafter, referred to as a plant material recommendation apparatus) and a user terminal 110 in a use environment.

The plant material recommendation apparatus 100 may be implemented as a computer or a server corresponding to a program, which is capable of providing a material intended by a user in consideration of an environment in which a plant facility is to be installed through a network to a user.

The user terminal 110 may be implemented as a smart phone, a notebook computer, or a computer and is not particularly limited thereto and may be implemented even as various devices such as a tablet PC, and the like. The user terminal 110 may be connected to the plant material recommendation apparatus 100 through a wired/wireless network.

In an embodiment, the plant material recommendation apparatus 100 receives information on the intended plant facility from the user terminal 110 to provide a suitable plant material through comparison with a pre-constructed plant material environment. Specifically, the user terminal 110 may select an environment in which the plant facility is installed or used and an intended material and the plant material recommendation apparatus 100 may provide the plant material stored in a database to the user terminal 110.

In an embodiment, the plant may include a general production machine, apparatus, factory facility, or an entire factor and may include facilities or industries capable of producing products such as power, oil, gas, and the like. Since characteristics and physical properties of the plant may vary according to the environment in which the plant is installed, the materials for manufacturing the plant need to be differently used and the plant material recommendation apparatus 100 may provide the plant material considering the plant environment to be installed and an intended material of the user. In addition, the plant material recommendation apparatus 100 may receive selection reasons most importantly selected by the user in selecting the plant material and provide an optimum plant material considering the selection reason importantly considered by the user.

Figure 2:
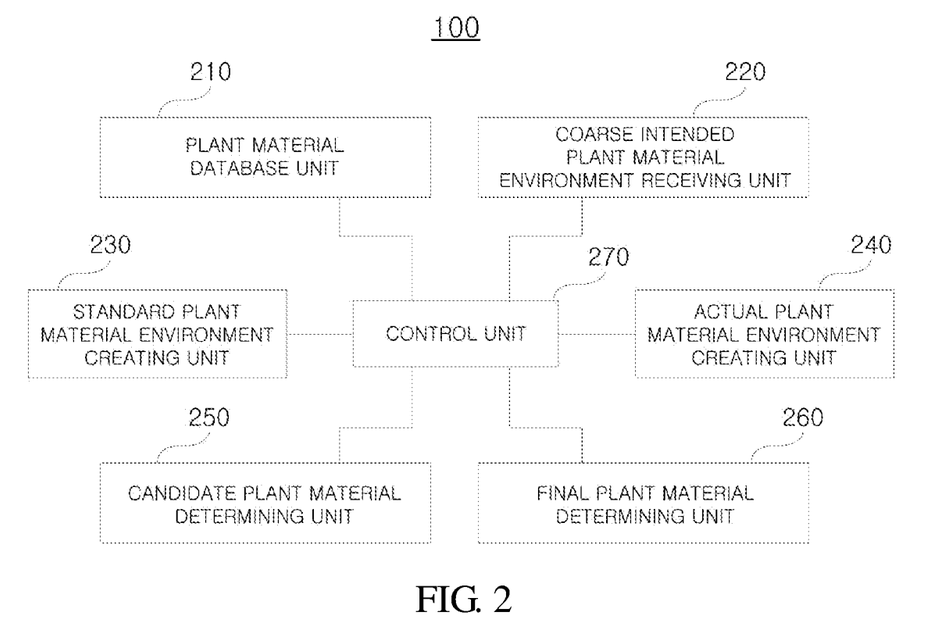
FIG. 2 is a block diagram for describing a plant material recommendation apparatus illustrated in FIG. 1.

FIG. 2 is a block diagram for describing a plant material recommendation apparatus illustrated in FIG. 1.

Referring to FIG. 2, the plant material recommendation apparatus 100 includes a plant material database unit 210, a coarse intended plant material environment receiving unit 220, a standard plant material environment creating unit 230, an actual plant material environment creating unit 240, a candidate plant material determining unit 250, a final plant material determining unit 260, and a control unit 270.

The plant material database unit 210 may store the plant material environment pre-constructed in the currently installed plant facility and the plant material. In an embodiment, the plant material database unit 210 may store information on the plant material primarily used in the plant facility and the environment in which the plant facility is primarily installed and store data regarding an installation environment and the plant material of the currently installed plant facility.

The coarse intended plant material environment receiving unit 220 may receive a coarse intended plant material environment in which the intended plant facility is to be installed. In an embodiment, the coarse intended plant material environment receiving unit 220 may receive information on the intended plant facility received from the user terminal 110 and information on a coarse plant material environment in which the intended plant facility is to be installed.

In an embodiment, the coarse intended plant material environment receiving unit 220 may receive a moisture range, an acidity range, a temperature range, a base range, and a wind range included in the coarse intended plant material environment. Specifically, when the coarse intended plant material environment receiving unit 220 receives the intended plant facility and the intended plant material environment from the user terminal 110, the coarse intended plant material environment receiving unit 220 may receive information on moisture, acidity, a temperature, a base and a wind on the plant material environment pre-installed in an environment similar to the intended plant material environment through the plant material database unit 210. Herein, each of ranges for the moisture, the acidity, the temperature, the base and the wind may include minimum, maximum, and average values.

The standard plant material environment creating unit 230 may create a standard plant material environment including a related material concentration (Conc.), a related material temperature (Temp.), and a related material velocity (Velocity) regarding the coarse intended plant material environment through the plant material database unit 210.

In an embodiment, the standard plant material environment creating unit 230 may calculate information on a related material included in the plant facility based on the information on the intended plant facility intended by the user and the plant material environment in which the plant facility is to be installed and create the standard plant material environment by comprehensively calculating the corresponding information. Herein, the standard plant material environment may include comprehensive information on the related plant facility by considering the information on the pre-constructed plant material environment and the plant facility intended by the user and the intended plant material environment information.

In an embodiment, the standard plant material environment creating unit 230 may create the standard plant material environment based on the information including the concentration, temperature, and velocity of the related material with respect to a general plant material environment, but periodically receives the information on the plant material and the plant material environment from the plant material database unit 210 to update data regarding the standard plant material environment.

The actual plant material environment creating unit 240 may convert the standard plant material environment into an actual plant material environment by estimating a material environment error range for the intended plant facility, which may occur in the coarse intended plant material environment. In an embodiment, the actual plant material environment creating unit 240 may calculate elements showing differences by comparing and analyzing the intended plant facility and the intended plant material environment and the actual plant material environment and convert the standard plant material environment to match the actual plant material environment based on calculated analysis values.

In an embodiment, the actual plant material environment creating unit 240 may determine the material environmental error range by analyzing a mutual influence between the moisture range, the acidity range, the temperature range, the base range, and the wind range in the coarse intended plant material environment. The actual plant material environment creating unit 240 may change the standard plant material environment to match the actual plant material environment according to the determined material environment error range. A process of analyzing the mutual influence between the moisture range, the acidity range, the temperature range, the base range, and the wind range will be described in detail with reference to FIG. 3.

The candidate plant material determining unit 250 may provide at least one recommended plant material which may be used in the actual plant material environment to the user terminal 110 from the plant material database unit 210. The candidate plant material determining unit 250 may receive a candidate material selection reason including at least one of market price, hardness, tensile strength, elongation, heat distortion temperature, thermal conductivity, expansion coefficient, dielectric breakdown strength, strong acidity resistance, and strong alkaline resistance for each of at least one candidate plant material selected by the user among at least one recommended plant material.

In an embodiment, the candidate plant material determining unit 250 may provide at least one recommended plant material available in the actual plant material environment to the user terminal 110 and receive a candidate material selection reason including the candidate plant material selected by the user and a selection reason.

In an embodiment, the candidate plant material determining unit 250 may determine reliability between a material property and the material selection reason of each of at least one recommended plant material and when the reliability is equal to or greater than a specific reference value, the corresponding recommended plant material may be included as at least one candidate plant material. For example, when the user selects the hardness and the tensile strength of the material as the candidate material selection reason, in the case where the recommended plant material property includes a property suitable for the corresponding reasons, the candidate plant material determining unit 250 determines the recommended plant material to be included as the candidate plant material.

The final plant material determining unit 260 may comprehensively analyze all candidate material selection reasons for at least one candidate plant material and determine a final plant material. In an embodiment, the final plant material determining unit 260 receives the candidate plant material and the candidate material selection reason from the user terminal 110 and analyzes the reason that the user considers the corresponding plant material most importantly to determine the final plant material. The plant material recommendation apparatus 100 may provide the final plant material which is finally determined to the user terminal 110.

In an embodiment, the final plant material determining unit 260 may determine N (N is a natural number) selection reasons which are most frequently selected based on all candidate material selection reasons. In addition, the final plant material determining unit 260 may determine the recommended plant material showing a highest matching degree with N selection reasons among at least one recommended plant material as the final plant material.

Specifically, the final plant material determining unit 260 may determine five selection reasons which are most selected by analyzing all candidate material selection reasons received from the user terminal 110 and determine the plant material showing the highest matching degree with five selection reasons among the recommended plant materials. A process of determining the matching degree will be described in detail with reference to FIG. 3.

Figure 3:
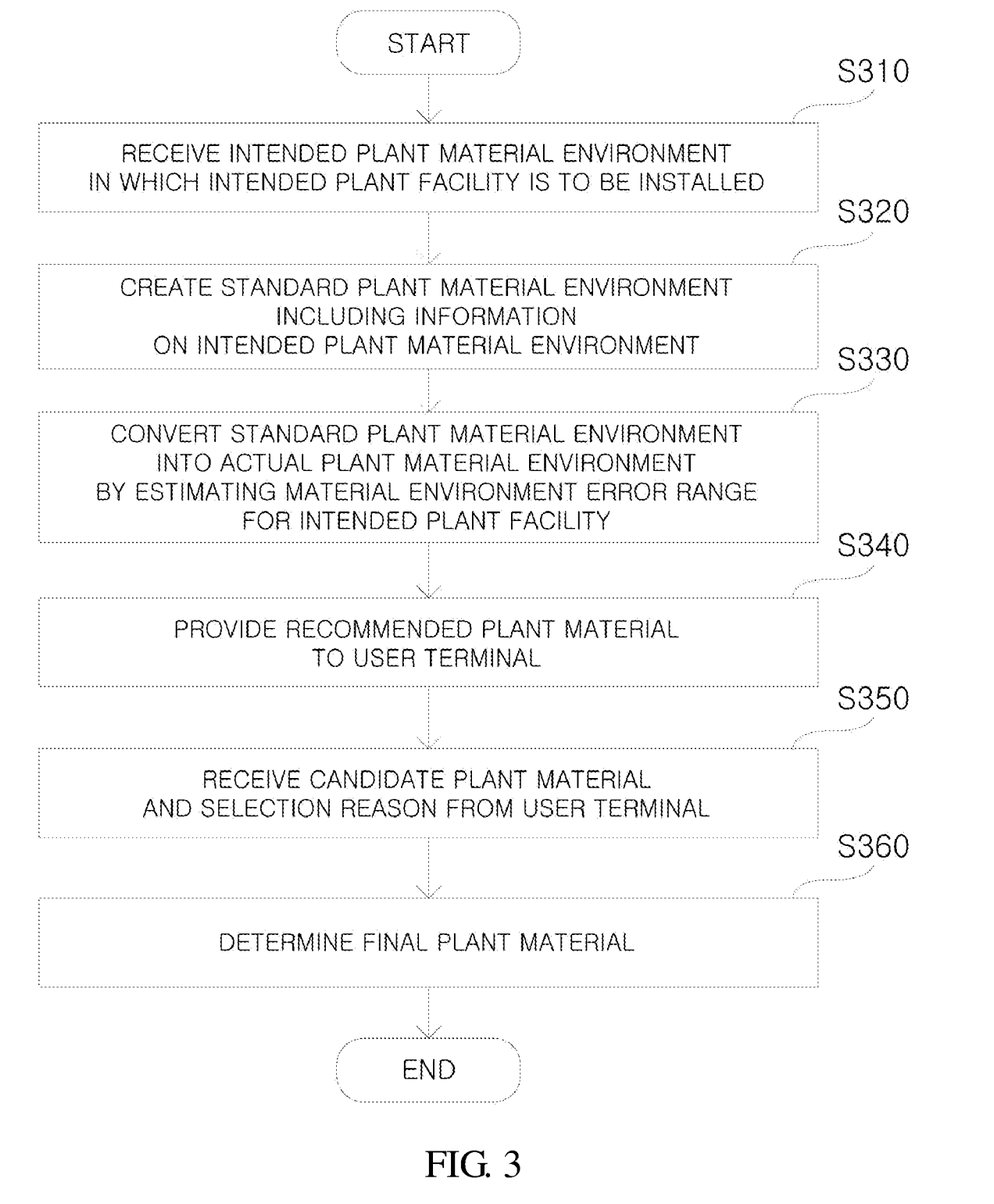
FIG. 3 is a flowchart for describing a process of recommending a plant material, which is performed by the plant material recommendation apparatus illustrated in FIG. 1.
Figure 4A:
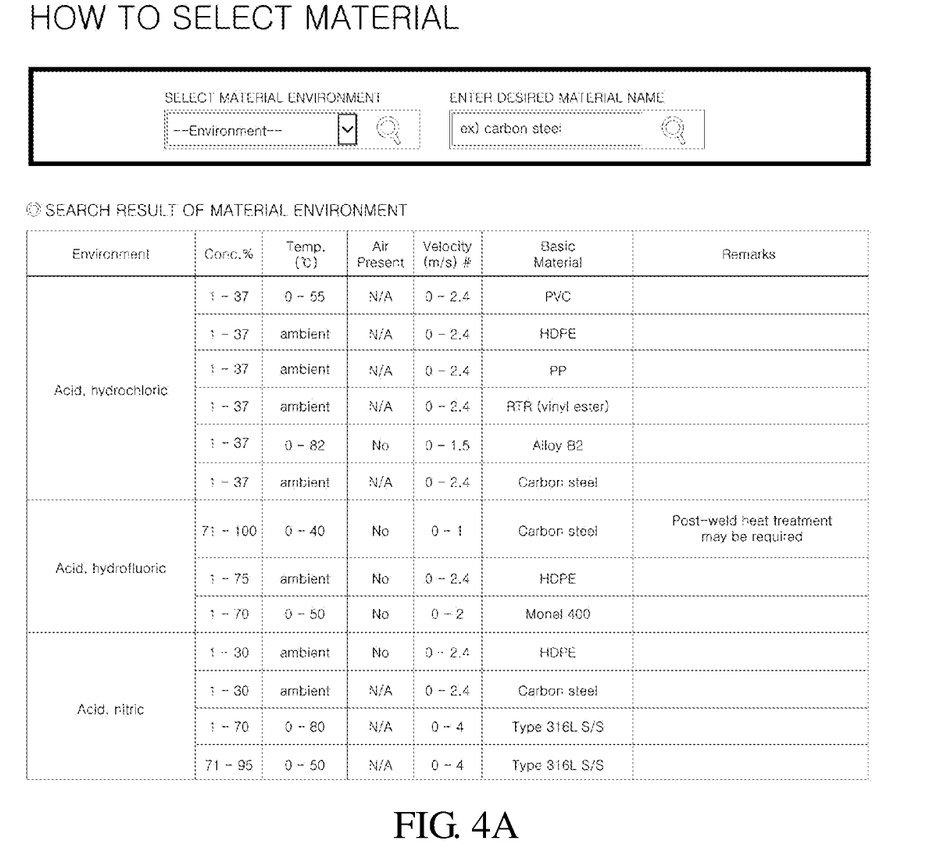
FIGS. 4A and 4B are exemplary diagrams illustrating a screen performed by the plant material recommendation apparatus illustrated in FIG. 1.
Figure 4B:
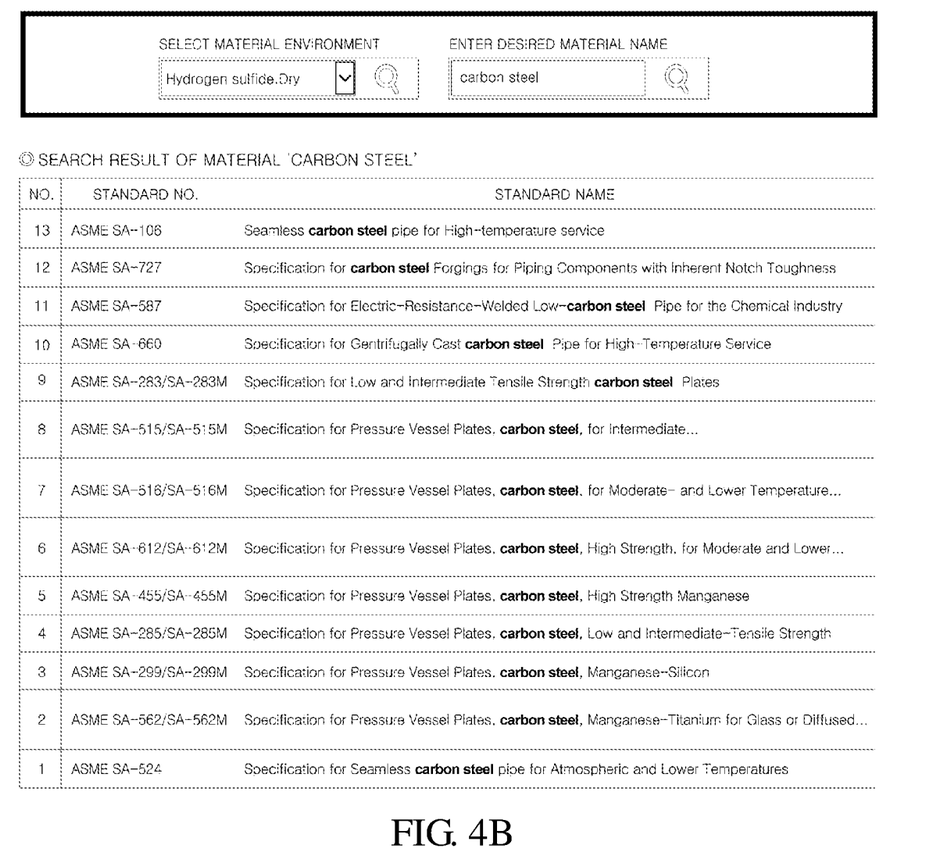

FIG. 3 is a flowchart for describing a process of recommending a plant material, which is performed by the plant material recommendation apparatus illustrated in FIG. 1. FIGS. 4A and 4B are exemplary diagrams illustrating a screen performed by the plant material recommendation apparatus illustrated in FIG. 1.

Referring to FIG. 3, the plant material recommendation apparatus 100 includes a plant material database unit 210, a coarse intended plant material environment receiving unit 220, a standard plant material environment creating unit 230, an actual plant material environment creating unit 240, a candidate plant material determining unit 250, a final plant material determining unit 260, and a control unit 270.

The plant material recommendation apparatus 100 may receive the intended plant facility and the coarse intended plant material environment in which the intended plant facility is to be installed from the user terminal 110 (step S310).

In an embodiment, the plant material recommendation apparatus 100 may receive the coarse intended plant material environment in which the intended plant facility intended by the user is to be installed through the coarse intended plant material environment receiving unit 220. The coarse intended plant material environment receiving unit 220 may receive information on the coarse intended plant material environment including the moisture range, the acidity range, the temperature range, the base range, and the wind range. Since the plant material to be used in the plant facility may vary depending on a place or environment where the plant facility is installed in spite of the same plant facility, the coarse intended plant material environment receiving unit 220 may comprehensively receive the information including the moisture, acidity, temperature, base, and wind ranges related to the intended plant material environment.

The plant material recommendation apparatus 100 may create the standard plant material environment including the information on the intended plant material environment (step S320).

In an embodiment, the plant material recommendation apparatus 100 may receive the standard plant material environment including the concentration, temperature, and velocity of the related material with respect to the coarse intended plant material environment through the standard plant material environment creating unit 230. For example, when the carbon steel used in the corresponding environment when carbon steel is used in an environment which is high in carbon dioxide as the coarse intended plant material environment, the standard plant material environment creating unit 230 may create the standard plant material environment based on the information on the concentration, temperature, and speed of the carbon steel used in the corresponding environment.

The plant material recommendation apparatus 100 may convert the standard plant material environment into the actual plant material environment by estimating the material environment error range for the intended plant facility (step S330).

In an embodiment, the plant material recommendation apparatus 100 may determine the material environmental error range by analyzing the mutual influence between the moisture range, the acidity range, the temperature range, the base range, and the wind range through the actual plant material environment creating unit 240. The actual plant material environment creating unit 240 may analyze the mutual influence between the moisture range, the acidity range, the temperature range, the base range, and the wind range according to an equation below.

$$\Delta H = H + \ln(P*C+S) + \text{Sin } 2\pi W + \text{Cos } 2\pi T$$

$$\Delta C = C + \ln(P*H+S) + \text{Sin } 2\pi W + \text{Cos } 2\pi T$$

$$\Delta T = T + \ln(P*H+W) + \text{Sin } 2\pi S + \text{Cos } 2\pi C$$

$$\Delta S = S + \ln(P*C+H) + \text{Sin } 2\pi W + \text{Cos } 2\pi T$$

$$\Delta W = W + \ln(P*C+S) + \text{Sin } 2\pi H + \text{Cos } 2\pi T \quad \text{[Equation 1]}$$

$\Delta H$ represents the moisture range, $\Delta C$ represents the acidity range, $\Delta T$ represents the temperature ranges, $\Delta S$ represents the base range, and $\Delta W$ represents the wind range and H, C, T, S, and W correspond to H, C, T, S, and W in a standard state, respectively and P corresponds to standard atmospheric pressure.

In an embodiment, the actual plant material environment creating unit 240 sums up values for the moisture, the acidity, the temperature, the base, and the wind in the standard state and change rate by the mutual influence of the moisture, the acidity, the temperature, the base, and the wind to determine the material environment error range. Specifically, the actual plant material environment creating unit 240 may determine the material environment error range by analyzing the change rate between a data value for the standard plant material environment created based on standard data received through the plant material database unit 210 and a data value for the actual plant material environment which may be actually created in the intended plant material environment intended by the user. Consequently, the actual plant material environment creating unit 240 may convert the standard plant material environment into the actual plant material environment based on the calculated material environment error range.

The plant material recommendation apparatus 100 may provide the recommended plant material which may be used in the actual plant material environment to the user terminal 110 from the plant material database unit 210.

In an embodiment, the plant material recommendation apparatus 100 may provide at least one recommended plant material suitable for the actual plant material environment created through the actual plant material environment creating unit 240 to the user terminal 110. The user terminal 110 may allow the user to select the plant material intended by the user among the received recommended plant materials and provide the selected plant material and selection reason to the plant material recommendation apparatus 100.

The plant material recommendation apparatus 100 may receive the candidate plant material and candidate material selection reason selected from the user terminal (step S350).

In an embodiment, the plant material recommendation apparatus 100 may receive a candidate material selection reason including at least one of market price, hardness, tensile strength, elongation, heat distortion temperature, thermal conductivity, expansion coefficient, dielectric breakdown strength, strong acidity resistance, and strong alkaline resistance for each of at least one candidate plant material selected through the candidate plant material determining unit 250. The candidate plant material determining unit 250 may determine the reliability between the material properties of each of the recommended plant materials and the candidate material selection reason and make the recommended plant material corresponding to the reliability which is equal to or more than a reference value as the candidate plant material.

Specifically, when the candidate plant material determining unit 250 selects the market price, hardness, tensile strength, and elongation rate of the plant material as main factors for selecting the candidate material from the user terminal 110, the candidate plant material determining unit 250 analyzes reliability regarding whether the material property among the recommended plant materials is suitable for the selection reason to select the recommended plant material having the reliability of the reference value or more as the candidate plant material. The reference value of the reliability for judging the suitability of the material property of the plant material and the selection reason may vary according to the factors of the selection reason received from the user terminal 110 and when a specific environment or a specific property (e.g., a physical property) of the plant material is selected as a very important selection reason, the corresponding material may be selected as the candidate plant material with the highest priority.

The plant material recommendation apparatus 100 comprehensively analyzes the candidate material selection reasons to determine the final plant material (step S360).

In an embodiment, the plant material recommendation apparatus 100 may determine N selection reasons having the highest selection frequency based on all candidate material selection reasons received through the final plant material determining unit 260 and determine the recommended plant material having the highest matching degree with N selection reasons as the final plant material. The final plant material determining unit 260 may determine the matching degree through an equation below.

$$Y=(\alpha*N1, \beta*N2, \gamma*N3, \ldots, \omega*Nn) \qquad \text{[Equation 2]}$$

Y represents the matching degree, $\alpha$, $\beta$, $\gamma$, ..., $\omega$ as weighting coefficients are sequentially calculated by $C*1/X$ (C is a positive constant and X is a positive number), and N1, N2, N3, ..., Nn correspond to the number of materials including elements arranged in a descending order in N selection reasons.

In an embodiment, the final plant material determining unit 260 may arrange N selection reasons in the descending order and calculate the weighting factors $\alpha$, $\beta$, $\gamma$, ..., (sequentially calculated by a value corresponding to $\alpha>\beta>\gamma> \ldots >\omega$). For example, when the user selects three selection reasons in the order of the market price, the thermal conductivity, and the dielectric breakdown strength, N1 may represent the number of plant materials including an element (e.g., copper) that selects the market price as the selection reason, N2 may represent the number of plant materials including an element (e.g., gold) that selects the thermal conductivity as the selection reason, and N3 may represent the number of plant materials including an element (e.g., carbon) that selects the dielectric breakdown strength as the selection reason.

Consequently, the final plant material determining unit 260 may determine the material including the element closest to the matching degree calculated through the equation above as the final plant material.

The present invention has been described with reference to the preferred embodiments, but those skilled in the art will understand that the present invention can be variously modified and changed without departing from the spirit and the scope of the present invention which are defined in the appended claims.

The disclosed technology may have the following effects. However, since as it is not meant that a particular embodiment should include all of the following effects or merely include the following effects, it should be understood that the scope of the disclosed technology is not to be construed as being limited thereby.

The plant material recommendation apparatus according to an embodiment of the present invention can recommend a plant material suitable for a use environment.

The plant material recommendation apparatus according to an embodiment of the present invention can provide a material of a plant facility suitable for an environment desired by a user based on information on an installed plant facility material and an environment.

The plant material recommendation apparatus according to an embodiment of the present invention can provide specific information regarding each material according to an environment of the plant facility material desired by the user and the plant material.

What is claimed is:

1. A plant material recommendation apparatus in a use environment, comprising:
   a processor and a non-transitory computer-readable recording medium communicatively coupled to the processor,
   wherein the processor:
   stores, in the non-transitory computer-readable recording medium, a plant material environment and a plant material pre-constructed in a currently installed plant facility;

receives a coarse intended plant material environment in which an intended plant facility is to be installed;

creates a standard plant material environment including a related material concentration (Conc.), a related material temperature (Temp.), and a related material velocity (Velocity) regarding the coarse intended plant material environment;

converts the standard plant material environment into an actual plant material environment by estimating a material environmental error range for the intended plant facility, which is expected to be occurred in the coarse intended plant material environment;

provides at least one recommended plant material which is configured to be used in the actual plant material environment to a user terminal;

receives a candidate material selection reason including at least one of market price, hardness, tensile strength, elongation, heat distortion temperature, thermal conductivity, expansion coefficient, dielectric breakdown strength, strong acidity resistance, and strong alkaline resistance for each of at least one candidate plant material selected among at least one recommended plant material; and comprehensively analyzes all candidate material selection reasons for at least one candidate plant material to a final plant material, wherein the coarse intended plant material environment includes information regarding a moisture range, an acidity range, a temperature range, a base range, and a wind range, wherein the processor determines the material environmental error range by analyzing a mutual influence between the moisture range, the acidity range, the temperature range, the base range, and the wind range in the coarse intended plant material environment, and wherein the processor analyzes the mutual influence according to an equation below:

$$\Delta H = H + \ln(P^*C+S) + \sin 2\pi W + \cos 2\pi T$$

$$\Delta C = C + \ln(P^*H+S) + \sin 2\pi W + \cos 2\pi T$$

$$\Delta T = T + \ln(P^*H+W) + \sin 2\pi S + \cos 2\pi C$$

$$\Delta S = S + \ln(P^*C+H) + \sin 2\pi W + \cos 2\pi T$$

$$\Delta W = W + \ln(P^*C+S) + \sin 2\pi H + \cos 2\pi T \quad \text{[Equation 1]}$$

ΔH represents the moisture range, ΔC represents the acidity range, ΔT represents the temperature ranges, ΔS represents the base range, and ΔW represents the wind range and H, C, T, S, and W correspond to H, C, T, S, and W in a standard state, respectively and P corresponds to standard atmospheric pressure.

2. The apparatus of claim 1, wherein the processor determines reliability between a material property and the material selection reason of each of at least one recommended plant material and makes the corresponding recommended plant material be included as at least one candidate plant material when the reliability is equal to or greater than a specific reference value.

3. The apparatus of claim 1, wherein the processor determines N (N is a natural number) selection reasons which are most frequently selected based on all candidate material selection reasons.

4. The apparatus of claim 3, wherein the processor determines the recommended plant material showing a highest matching degree with N selection reasons among at least one recommended plant material as the final plant material.

5. A plant material recommendation apparatus in a use environment, comprising:

a processor and a non-transitory computer-readable recording medium communicatively coupled to the processor, wherein the processor:

stores, in the non-transitory computer-readable recording medium, a plant material environment and a plant material pre-constructed in a currently installed plant facility;

receives a coarse intended plant material environment in which an intended plant facility is to be installed;

creates a standard plant material environment including a related material concentration (Conc.), a related material temperature (Temp.), and a related material velocity (Velocity) regarding the coarse intended plant material environment;

converts the standard plant material environment into an actual plant material environment by estimating a material environmental error range for the intended plant facility, which is configured to occur in the coarse intended plant material environment;

provides at least one recommended plant material which is configured to be used in the actual plant material environment to a user terminal;

receives a candidate material selection reason including at least one of market price, hardness, tensile strength, elongation, heat distortion temperature, thermal conductivity, expansion coefficient, dielectric breakdown strength, strong acidity resistance, and strong alkaline resistance for each of at least one candidate plant material selected among at least one recommended plant material; and comprehensively analyzes all candidate material selection reasons for at least one candidate plant material to a final plant material, wherein the processor determines N (N is a natural number) selection reasons which are most frequently selected based on all candidate material selection reasons, wherein the processor determines the recommended plant material showing a highest matching degree with N selection reasons among at least one recommended plant material as the final plant material, and wherein the processor determines the matching degree through an equation below:

$$Y = (\alpha^* N1, \beta^* N2, \gamma^* N3, \ldots, \omega^* Nn) \quad \text{[Equation 2]}$$

Y represents the matching degree, α, β, γ, . . . , ω as weighting coefficients are sequentially calculated by C*1/X (C is a positive constant and X is a positive number), and N1, N2, N3, . . . , Nn correspond to the number of materials including elements arranged in a descending order in N selection reasons.

* * * * *